(12) United States Patent
Suzuki et al.

(10) Patent No.: US 7,705,789 B2
(45) Date of Patent: Apr. 27, 2010

(54) PORTABLE WIRELESS DEVICE

(75) Inventors: Yuichiro Suzuki, Shizuoka (JP); Seiichi Nakanishi, Ishikawa (JP); Masanori Kubota, Kanagawa (JP); Masayoshi Hirai, Kanagawa (JP); Kouta Aoki, Kanagawa (JP); Yutaka Saitoh, Ishikawa (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 12/066,432

(22) PCT Filed: Sep. 12, 2006

(86) PCT No.: PCT/JP2006/318027

§ 371 (c)(1),
(2), (4) Date: Mar. 11, 2008

(87) PCT Pub. No.: WO2007/032330

PCT Pub. Date: Mar. 22, 2007

(65) Prior Publication Data

US 2009/0128424 A1    May 21, 2009

(30) Foreign Application Priority Data

Sep. 14, 2005    (JP)    ............................. 2005-267024

(51) Int. Cl.
*H01Q 1/24*    (2006.01)
(52) U.S. Cl. ................................ 343/702; 343/700 MS; 343/818
(58) Field of Classification Search ........................ None
See application file for complete search history.

(56) References Cited

U.S. PATENT DOCUMENTS

| 7,102,578 | B2 * | 9/2006 | Minemura | 343/702 |
| 7,173,568 | B2 * | 2/2007 | Kanazawa | 343/702 |
| 7,333,154 | B2 * | 2/2008 | Dean et al. | 348/722 |
| 7,339,530 | B2 * | 3/2008 | Ying et al. | 343/702 |
| 7,453,405 | B2 * | 11/2008 | Nishikido et al. | 343/702 |
| 7,532,168 | B2 * | 5/2009 | Nakanishi et al. | 343/702 |
| 2009/0033562 | A1 * | 2/2009 | Takeuchi et al. | 343/702 |

* cited by examiner

*Primary Examiner*—Trinh V Dinh
(74) *Attorney, Agent, or Firm*—Pearne & Gordon LLP

(57) ABSTRACT

Herein disclosed is a portable wireless device, comprising: a first case 11 having a metal portion; a second case 12; a hinge portion 13 operative to rotatably connect the first case with the second case; a circuit board 18 having a ground pattern, the circuit board accommodated in the second case; and a feed portion connected to the circuit board, the hinge portion 13 having a rotating shaft 23 formed by a conductive metal, and the first case, the rotating shaft 23 and the ground pattern collectively function as an antenna element, wherein the portable wireless device further comprises a first conductor element 25 accommodated in the first case 11 in spaced-apart relationship with the rotating shaft 23 with a predetermined gap, the first conductor element having an electrical length substantially equal to a half wavelength of a wireless frequency.

4 Claims, 13 Drawing Sheets

PORTABLE WIRELESS DEVICE

TECHNICAL FIELD

The present invention relates to a portable wireless device, and more particularly to a portable wireless device having an excellent antenna characteristic over a wide frequency band with an upper case and lower case being in both opened and closed states.

BACKGROUND ART

Up until now, there has been proposed a portable wireless device capable of being folded exemplified by a foldable wireless cellular phone, the portable wireless device comprising an upper case, a lower case and a hinge portion rotatably connecting the upper case and the lower case to ensure the upper and the lower cases being in one of a state to be opened (hereinafter simply referred to as an opened state) and a state to be closed (hereinafter simply referred to as a closed state). This results in the fact that the portable wireless device has two advantages, one of which is user-friendliness in that it has a wide display to be watched in the opened state, while another of which is portability in that the portable wireless device has compact shape in the closed state.

In recent years, the wireless cellular phone is expected to be smaller and thinner than it used to be. The conventional portable wireless device capable of being folded comprises an upper case to have an antenna element accommodated therein, a lower case to have a feeding circuit accommodated therein, and a hinge portion having a feeder line to have an electric power supplied therethrough to ensure that the electric power is supplied from the feeding circuit to the antenna element, which is disclosed in patent document 1.

Additionally, in recent years, an antenna characteristic with the portable wireless device being placed on a desk with the fold closed, that is to say, "a stand-by mode" is regarded as an important feature. The conventional portable wireless device capable of being folded comprises a terminal accommodating a circuit board having a front surface (a first surface) and a back surface (a second surface) to respectively have antenna elements mounted thereon, which is disclosed in patent document 2. The conventional portable wireless device is operative to maintain telecommunication quality by utilizing the antenna element mounted on the second surface under the condition that the antenna characteristic of the antenna element mounted on the first surface is deteriorated caused by the desk and the antenna element being closely positioned with each other.

(patent document 1)

Japanese Patent Laying-Open Publication No. 2001-156898

(patent document 2)

Japanese Patent Laying-Open Publication No. 2002-368850

DISCLOSURE OF THE INVENTION

Problems to be Solved by the Invention

The conventional portable wireless device according to the patent document 1, however, encounters such a problem that the telecommunication quality is not maintained in the closed state due to the fact that antenna currents traveling the antenna elements in the upper case and lower case have respective phases reverse to each other, which results in the reduction of the radiation efficiency.

The conventional portable wireless device according to the patent document 2, however, encounters such a problem that the conventional portable wireless device has difficulty in being thin-shaped and small-shaped due to the fact that the two antenna elements are required to be placed on each of the front surface and the back surface.

It is, therefore, an object of the present invention to provide a portable wireless device having excellent antenna characteristics over a wide frequency band with an upper case and a lower case being in both opened state and closed state.

Means for Solving the Problems

In accordance with the present invention, there is provided a portable wireless device, comprising: a first case having a metal portion; a second case; a hinge portion operative to rotatably connect the first case with the second case; a circuit board having a ground pattern, the circuit board accommodated in the second case; and a feed portion connected to the circuit board, the hinge portion having a rotating shaft formed by a conductive metal, and the metal portion, the rotating shaft and the ground pattern collectively function as an antenna element, wherein the portable wireless device further comprises a first conductor element accommodated in the first case in spaced-apart relationship with the rotating shaft with a predetermined gap, the first conductor element having an electrical length substantially equal to a half wavelength of a wireless frequency.

The portable wireless device according to the present invention can have an excellent antenna characteristic with the portable wireless device being placed on a desk with the fold closed, that is, a stand-by mode, due to the fact that the first conductor element functions as a director element in the closed state, while achieving high telecommunication quality in the opened state.

In accordance with the present invention, there is provided a portable wireless device, wherein the rotating shaft is in spaced-apart relationship with the metal portion with a predetermined gap in such a way that the rotating shaft and the metal portion are electromagnetically connected with each other, and wherein the rotating shaft is disposed at the hinge portion in spaced-apart relationship with the ground pattern to ensure the rotating shaft electrically connected with the feed portion.

The portable wireless device according to the present invention can improve the radiation efficiency and the directional gain compared to those of the conventional portable wireless device due to the fact that the current is concentrated in the hinge portion.

In accordance with the present invention, there is provided a portable wireless device, which further comprises a second conductor element accommodated in the second case in such a way that the first conductor element and the second conductor element are positioned with a predetermined gap under the condition that the first and second cases are in opened state while the first conductor element and the second conductor element are positioned with a gap wider than the predetermined gap under the condition that the first and second cases are in closed state.

The portable wireless device according to the present invention can have an excellent antenna characteristic over a wide frequency band with an upper case and lower case being in both opened and closed states, resulting from the fact that the strength of the electromagnetic connection between the first conductor element and the second conductor element varies to ensure the high radiation efficiency and the high directional gain both in the opened state and the closed state.

In accordance with the present invention, there is provided a portable wireless device, wherein the first case has an acoustic aperture formed on one side to have incoming acoustic wave passed therethrough, and the first conductor element is placed on another side of the first case, the one side and another side opposite to each other.

The portable wireless device according to the present invention can prevent the radio wave radiated through the antenna from being affected by the acoustic aperture with the portable wireless device being placed on a desk with the fold closed, resulting from the fact that the radiation from the first conductor element is not intercepted by the metal portion of the first case. Therefore, the portable wireless device can have an excellent antenna characteristic over a wide frequency band with an upper case and lower case being both in the opened state and the closed state.

Advantageous Effect of the Invention

The portable wireless device according to the present invention makes it possible to have excellent antenna characteristics over a wide frequency band with an upper case and lower case being in both opened and closed states while being small-shaped and thin-shaped.

BRIEF DESCRIPTION OF THE DRAWINGS

FIG. 9 (a) is a graph showing a directional characteristic of the portable wireless device with the first conductor element in the closed state, and FIG. 9 (b) is a graph showing a directional characteristic of the portable wireless device without the first conductor element in the closed state;

DESCRIPTION OF THE REFERENCE NUMERALS

11: first case
12: second case
13: hinge portion
14: fixation screw
15: upper cover (display portion side)
16: upper case (sub display portion side)
17: hinge bracket
18: circuit board
19: wireless circuit
20: matching circuit
23: rotating shaft
23A: first rotating shaft portion (first case side)
23B: second rotating shaft portion (second case side)
24: feeding spring (feed portion)
25: first conductor element
26: flexible cable
27: display portion
28: sub display portion
29: earpiece (acoustic aperture for incoming acoustic wave)
30: second conductor element
31: direction of an incoming wave
32: human head
33: VSWR characteristic (closed state with the first conductor element)
34: VSWR characteristic (closed state without the first conductor element)
35: directional characteristic (E φ polarization component in the closed state with the first conductor element)
36: directional characteristic (E φ polarization component in the closed state without the first conductor element)
37: VSWR characteristic (opened state with the second conductor element)
38: VSWR characteristic (opened state without the second conductor element)

DESCRIPTION OF THE PREFERRED EMBODIMENTS

The embodiments of the portable wireless device according to the present invention will now be described in detail in accordance with accompanying drawings.

First Embodiment

Referring now to FIGS. 1 to 9 of the accompanying drawings, a first embodiment of the portable wireless device according to the present invention will hereinafter be described in detail.

Figure 1:
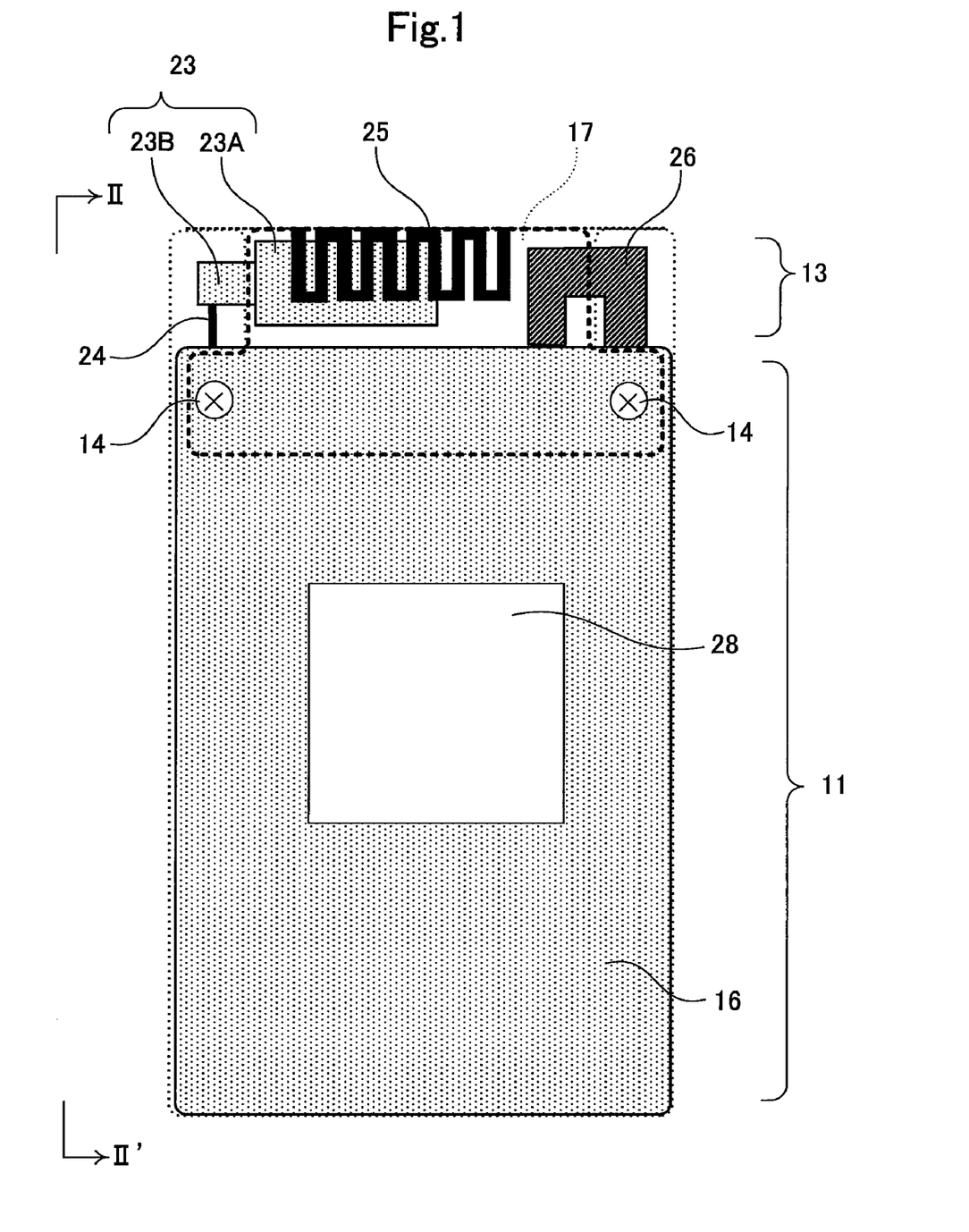
FIG. 1 is a front view showing the portable wireless device in the closed state according to the first embodiment of the present invention.
Figure 2:
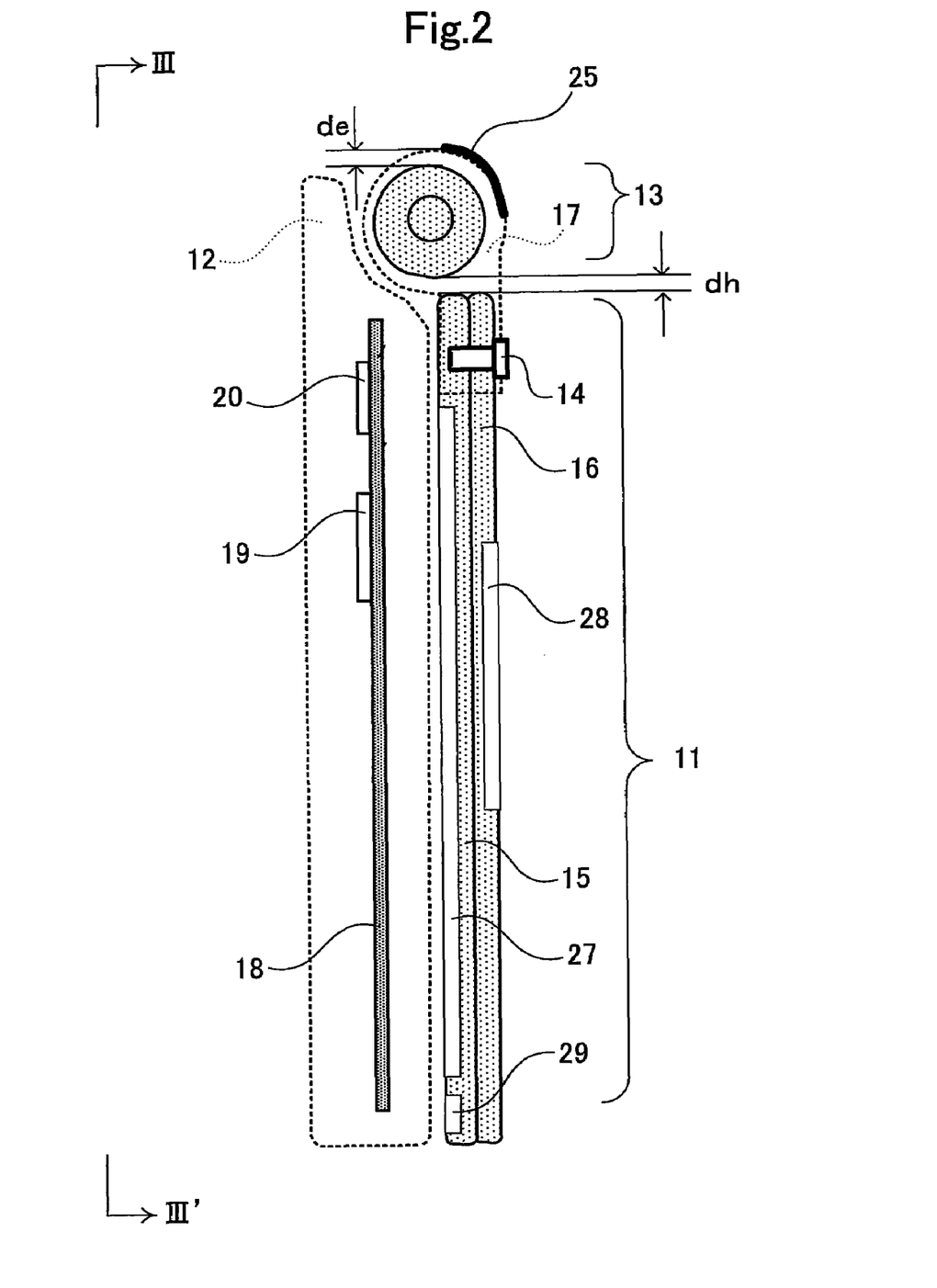
FIG. 2 is a side view showing the portable wireless device in the closed state according to the first embodiment of the present invention.
Figure 3:
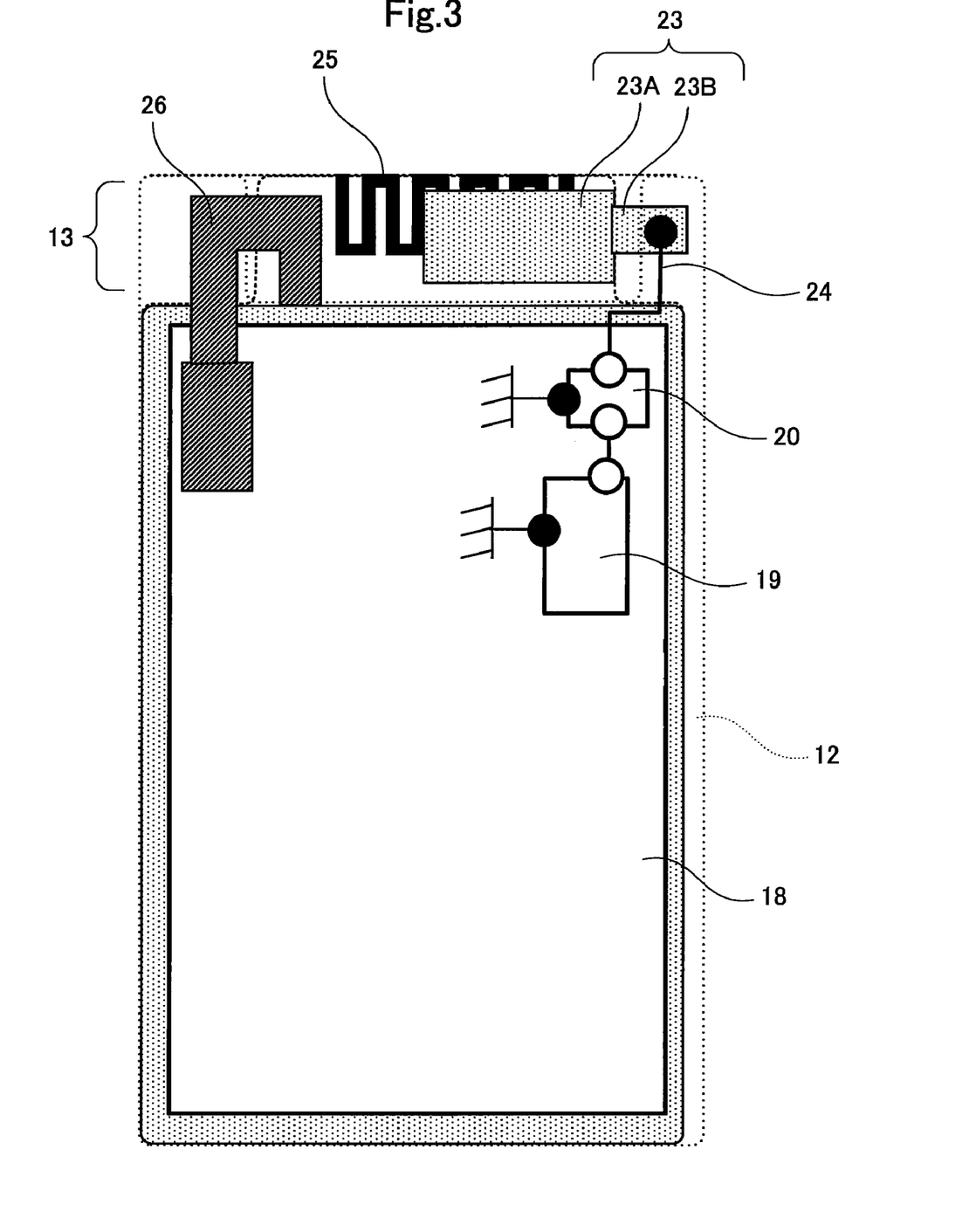
FIG. 3 is a rear view showing the portable wireless device in the closed state according to the first embodiment of the present invention.
Figure 4:
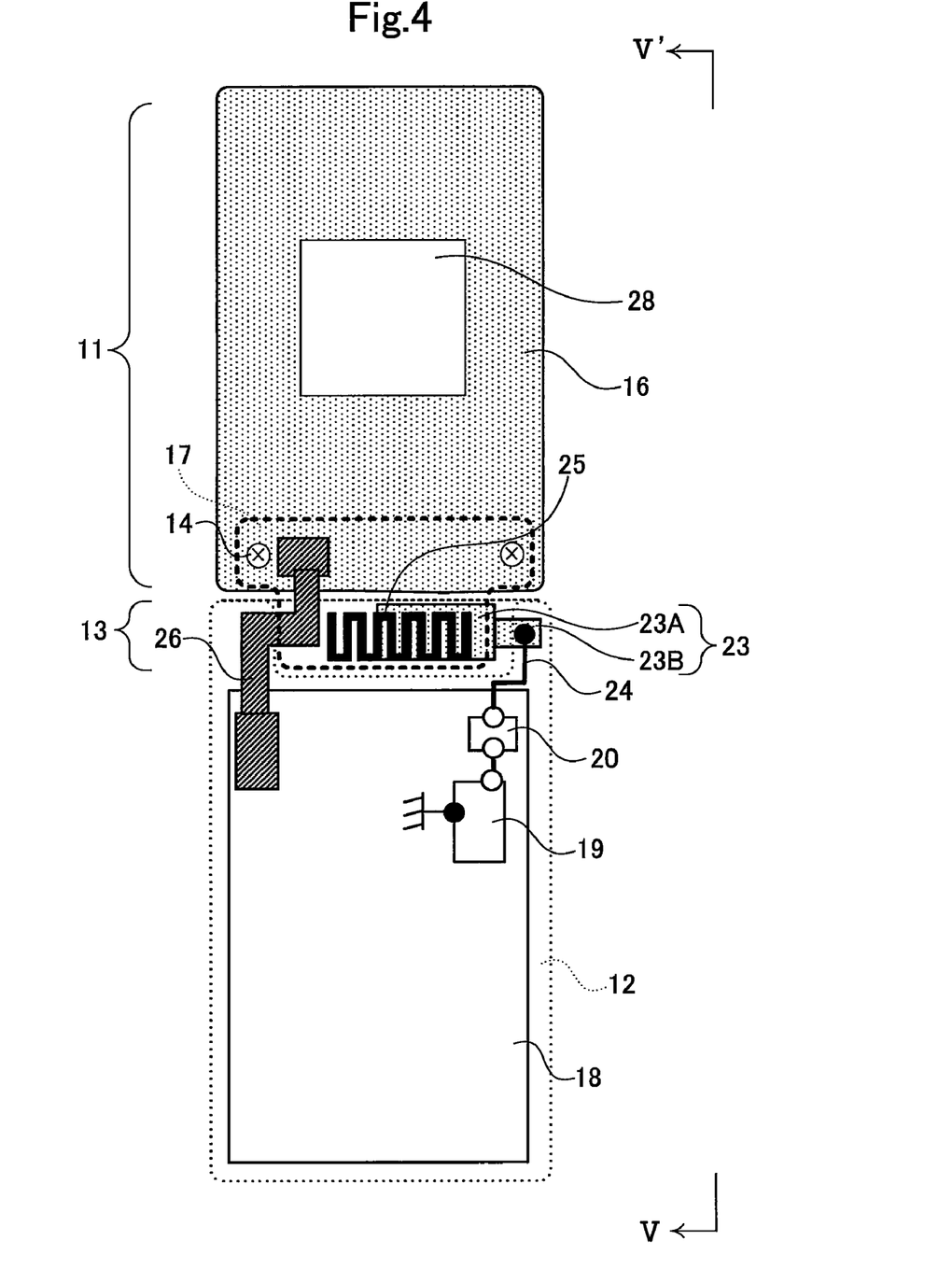
FIG. 4 is a rear view showing the portable wireless device in the opened state according to the first embodiment of the present invention.
Figure 5:
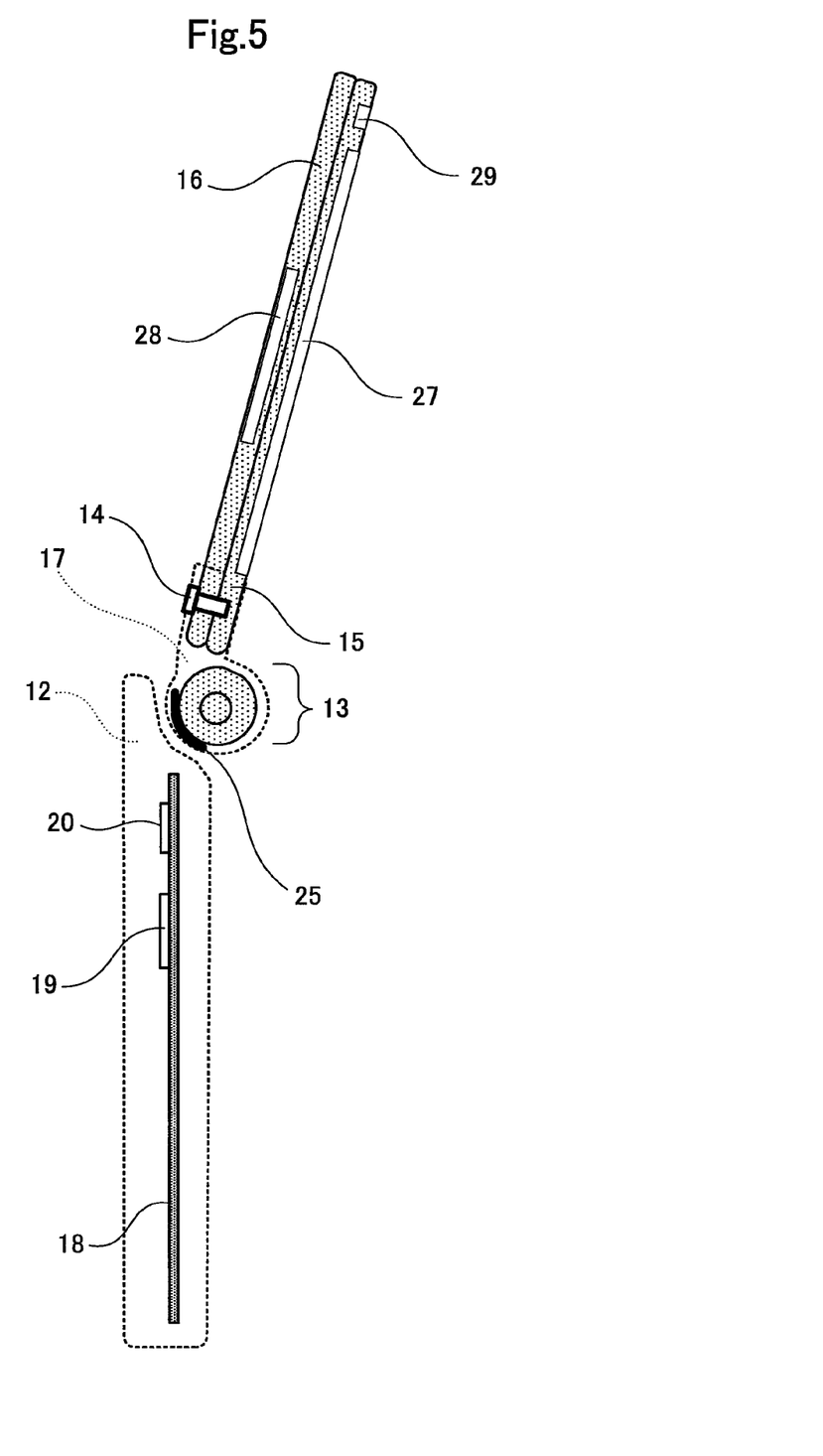
FIG. 5 is a side view showing the portable wireless device in the opened state according to the first embodiment of the present invention.

FIG. 1 is a front view showing the portable wireless device in the closed state according to the first embodiment of the present invention. FIG. 2 is a side view showing the portable wireless device taken along the line II-II' of FIG. 1. FIG. 3 is a rear view showing the portable wireless device taken along the line III-III' of FIG. 2. FIG. 4 is a rear view showing the portable wireless device in the opened state according to the first embodiment of the present invention. FIG. 5 is a side view showing the portable wireless device taken along the line V-V' of FIG. 4. FIGS. 1 to 5 respectively show internal structure of the distinctive portions and external constitution of the other portions.

As shown in FIGS. 1 and 2, the portable wireless device according to this embodiment comprises an upper case, that is, a first case 11, a lower case, that is, a second case 12, and a hinge portion 13. The hinge portion 13 is operative to rotatably connect the first case 11 with the second case 12 to ensure the portable wireless device having an opened state and a closed state.

The first case 11 is constituted by an upper cover 15, an upper case 16, and a hinge bracket 17 which are fixed with each other by fixation screws 14. The upper cover 15 and the upper case 16, collectively constituting a metal portion, are formed by a metal having conductivity. The hinge bracket 17 is formed by an acrylonitrile-butadiene-styrene (ABS) resin as a non-conducting substance.

The first case 11 further has a display portion 27, a sub display portion 28, and an earpiece 29 accommodated therein, the display portion 27 partly constituted by a liquid crystal display device. The earpiece 29 partly forms an acoustic aperture for incoming acoustic wave.

The second case 12 has a plurality of operation keys which are not shown. The second case 12 further has a circuit board 18 accommodated therein, the circuit board 18 being constituted by a wireless circuit 19, a matching circuit 20, a control unit, and an information processing unit, the control unit and the information processing unit being not shown in the drawings. The circuit board 18 has a ground pattern, as a ground potential, formed substantially on the whole surface of the circuit board 18.

The hinge portion 13 has a flexible cable 26 for connecting a circuit board, not shown, in the first case 11 with the circuit board 18 in the second case 12.

The hinge portion 13 further has a rotating shaft 23 to rotatably connect the first case 11 with the second case 12. The rotating shaft 23 is constituted by a first rotating shaft portion 23A and a second rotating shaft portion 23B. The first case 11 and the first rotating shaft portion 23A are mechanically connected with each other, while the second case 12 and the second rotating shaft portion 23B are mechanically connected with each other. As shown in FIG. 3, the first rotating shaft portion 23A and the second rotating shaft portion 23B are rotatable with respect to each other around the connecting point, and connected to ensure that a direct current flows therebetween.

The first case 11 and the second case 12 each have, for example, a length of approximately 100 mm and a width of approximately 50 mm. The circuit board 18 of the second case 12 is constituted by a printed circuit board having a thickness of 1 mm, a length of 60 mm, and a width of 40 mm. The rotating shaft 23 is constituted by a metal having high conductivity and high mechanical strength, exemplified by steel, and having a diameter of 8 mm and a length of 20 mm.

As shown in FIG. 3, the rotating shaft 23 has one end portion electrically connected with a feeding spring 24 placed on the circuit board 18 to ensure the rotating shaft 23 connected with the wireless circuit 19 through the matching circuit 20. The rotating shaft 23 and the metal portion of the first case 11 are separated with a gap of "dh" (such as 2 mm) as shown in FIG. 2. It is preferable that the gap "dh" is set within the range of 1 mm to 5 mm to ensure that the rotating shaft 23 and the metal portion of the first case 11 are capacitively coupled with each other when the power is fed, though the range is not limited thereto. The rotating shaft 23 and the ground pattern of the circuit board 18 are separated with a gap of approximately 4 mm according to this embodiment. It is preferable that the gap between the rotating shaft 23 and the ground pattern is set within the range of 2 mm to 5 mm, but not limited thereto. The feeding spring 24 partly constitutes a feed portion.

The portable wireless device according to this embodiment further comprises a first conductor element 25. The first conductor element 25 is attached to the hinge bracket 17 made of the ABS (acrylonitrile butadiene styrene) resin, and separated from the rotating shaft 23 with a gap of "de" (such as 2 mm). In other words, the first conductor element 25 is supported by the first case 11 in such a way that the first conductor element 25 is rotated around the rotating shaft 23 together with the first case 11 at the time when the first case is rotated to switch the opened state and closed state of the portable wireless device. It is preferable that the gap "de" is set within the range of 0.5 mm to 5 mm to ensure that the first conductor element 25 functions as a director element in the closed state. The gap "de" is, however, not limited to the above mentioned range.

The first conductor element 25 has an electrical length substantially equal to the half-wavelength at the operating frequency (for example 75 mm at 2 GHz).

The portable wireless device according to this embodiment is assumed to be used in the wireless phone system with the method of W-CDMA (Wideband-Code Division Multiple Access) at 1.7 GHz with the bandwidth of 130 MHz and at 2 GHz with the bandwidth of 250 MHz. The portable wireless device according to the embodiments of this invention may be used under any other communication methods and frequencies by adjusting the designing conditions.

The portable wireless device according to the first embodiment as described above is constructed in such a way that the rotating shaft 23 and the metal portion of the first case 11 are placed with the predetermined gap of "dh" therebetween under the condition that the portable wireless device assumes the closed state as shown in FIGS. 1 to 3, which results in the fact that the rotating shaft 23 functions as a monopole antenna with the one-quarter wavelength at the operating frequency between 1.7 GHz to 2 GHz, while the first conductor element 25 functioning as a director element.

Figure 6:
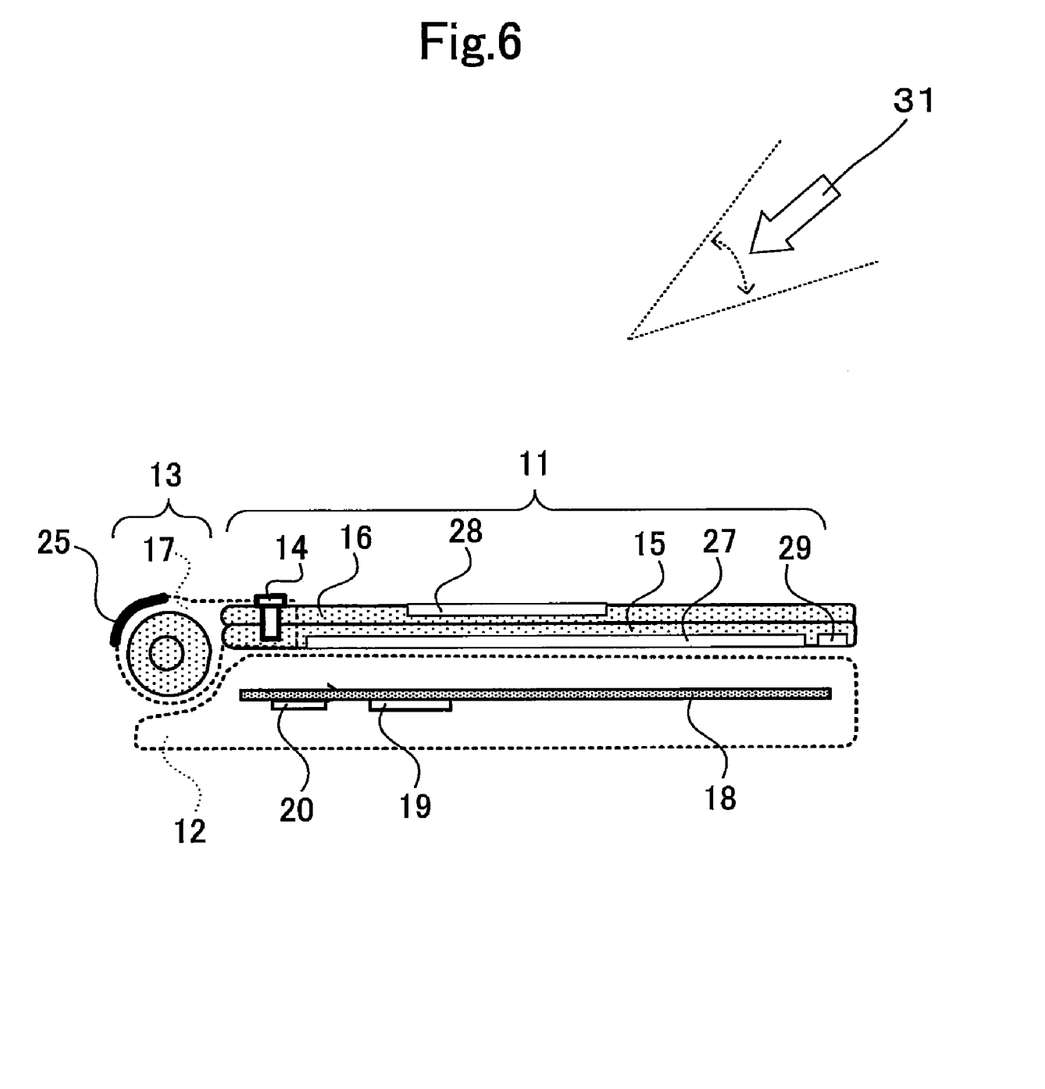
FIG. 6 is a schematic view showing a coordination system and the direction of the incoming wave in the stand-by mode on the desk.

Under this condition, the current is concentrated in the hinge portion 13 constituted by the rotating shaft 23 due to the fact that the rotating shaft 23 and the metal portion of the first case 11 are separated with the predetermined gap of "dh". This results in the fact that the portable wireless device according to this embodiment can improve the radiation efficiency and the directional gain compared to those of the conventional portable wireless device. On the other hand, the radiation efficiency of the conventional portable wireless device is deteriorated due to the fact that the antenna current (the current) is distributed to the metal portion of the first case 11, thereby resulting in the current at the metal portion of the first case 11 and the current at the circuit board 18 having respective phases reverse to each other, under the condition that the rotating shaft 23 and the metal portion of the first case 11 are connected to ensure the direct current flowing therebetween, or electromagnetically coupled strongly with the capacity coupling. In addition, the antenna current at the first conductor element 25 is reduced due to the fact that the current is not concentrated in the hinge portion 13. This results in the fact that the directional gain of the conventional portable wireless device in the direction of the base station, that is, in the direction of an incoming wave 31 shown in FIG. 6 is deteriorated. This means that it is necessary to separate the rotating shaft 23 and the metal portion of the first case 11 with the predetermined gap of "dh" to ensure that the antenna characteristic is maintained in the closed state. Here, the direction of the base station is determined by the elevation angle of 20 to 40 degrees with respect to the horizontal plane.

Figure 8:
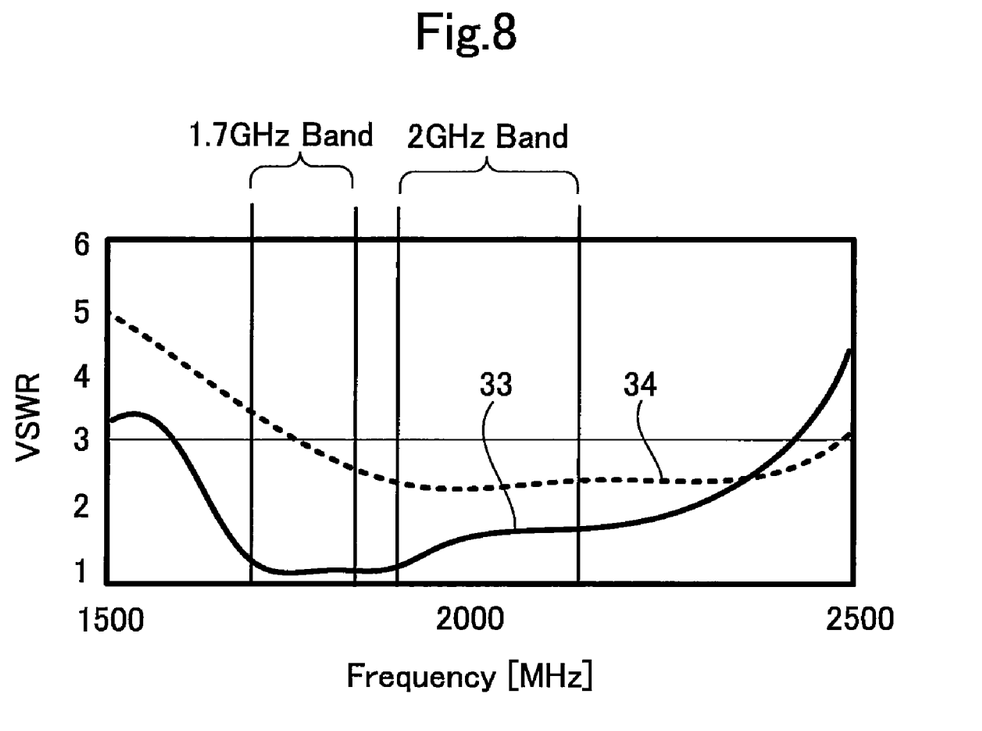
FIG. 8 is a graph showing the standing wave characteristics varied in response to whether the first conductor element is accommodated in the portable wireless device or not, with the portable wireless device in the closed state.

FIG. 8 is a graph showing the VSWR (Voltage Standing Wave Ratio) with respect to the frequencies of the high-frequency signals fed to the antenna under the condition that the portable wireless device is in the closed state. In FIG. 8, the solid line represents a VSWR characteristic 33 of the portable wireless device with the first conductor element 25 according to this embodiment. The dotted line represents a VSWR characteristic 34 without the first conductor element 25.

As shown in FIG. 8, the portable wireless device with the first conductor element 25 according to this embodiment has an improved VSWR characteristic compared to that of the conventional portable wireless device without the first conductor element 25, resulting from the fact that the first conductor element 25 is adapted to induce resonance. In other words, excellent antenna characteristic is achieved over the wide band at and around the desired frequencies.

For example, the conventional portable wireless device without the first conductor element 25 has a radiation efficiency value, determined by the ratio of an input power to a radiated power, of −7.0 dB at the frequency of 2170 MHz. Meanwhile, the portable wireless device according to this embodiment with the first conductor element 25 having meandering shape has a radiation efficiency value of −3.5 dB which is improved compared to the radiation efficiency of the conventional portable wireless device without the first conductor element 25 having meandering shape.

Figure 9A:
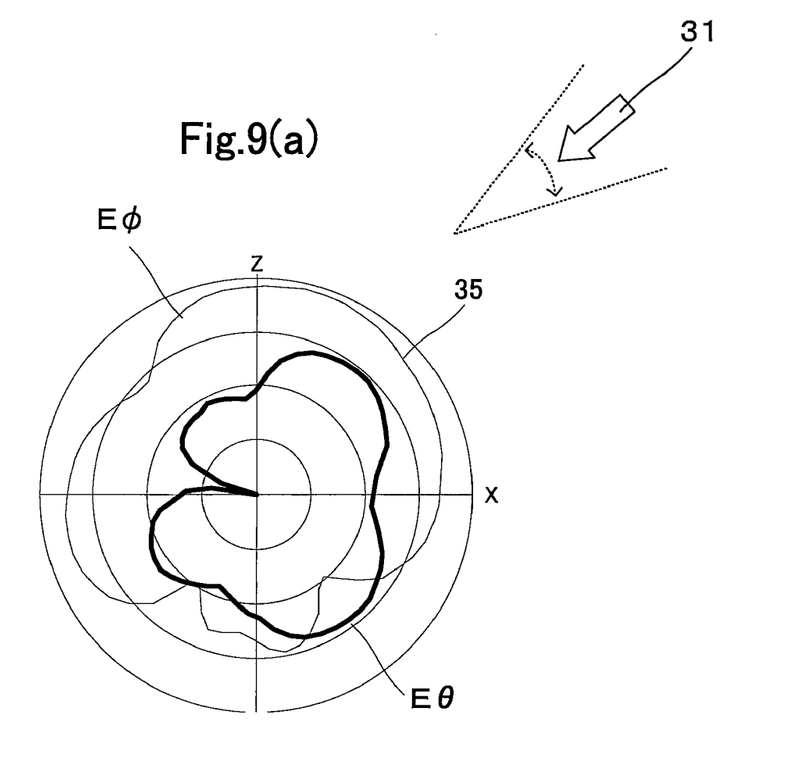
Figure 9B:
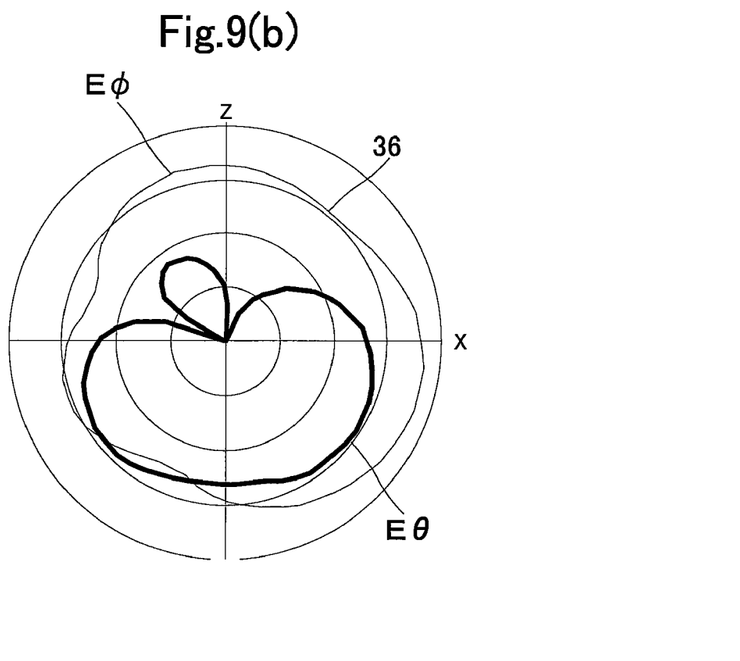

FIG. 9 (a) is a graph showing a directional characteristic 35 of the portable wireless device with the first conductor element 25 in the stand-by mode on the desk. FIG. 9 (b) is a graph showing a directional characteristic 36 of the conventional portable wireless device without the first conductor element 25 in the stand-by mode on the desk. Here, the coordinate system under the stand-by mode on the desk is shown in FIG. 6.

The portable wireless device with the first conductor element 25 according to this embodiment can improve, with 5 dB, the directional characteristic in the direction of the incoming wave 31 from the base station shown in FIG. 6 compared to the conventional portable wireless device without the first conductor element 25, due to the fact that the first conductor element 25 is adapted to induce resonance. In other words, the portable wireless device can improve the radiation efficiency and the directional characteristic in the direction of the incoming wave 31, which results in the excellent antenna characteristics under the stand-by mode on the desk.

The following description will be directed to the operation of the portable wireless device in the opened state with reference to the drawings shown in FIGS. 4 and 5. The rotating shaft 23 and the metal portion of the first case 11 is electromagnetically connected with each other with the predetermined gap of "dh" therebetween. The rotating shaft 23, the metal portion of the first case 11 and the circuit board 18 collectively functions as a dipole antenna, that is, an antenna element at the operational frequency including the frequency bands of 1.7 GHz and 2 GHz.

Figure 7:
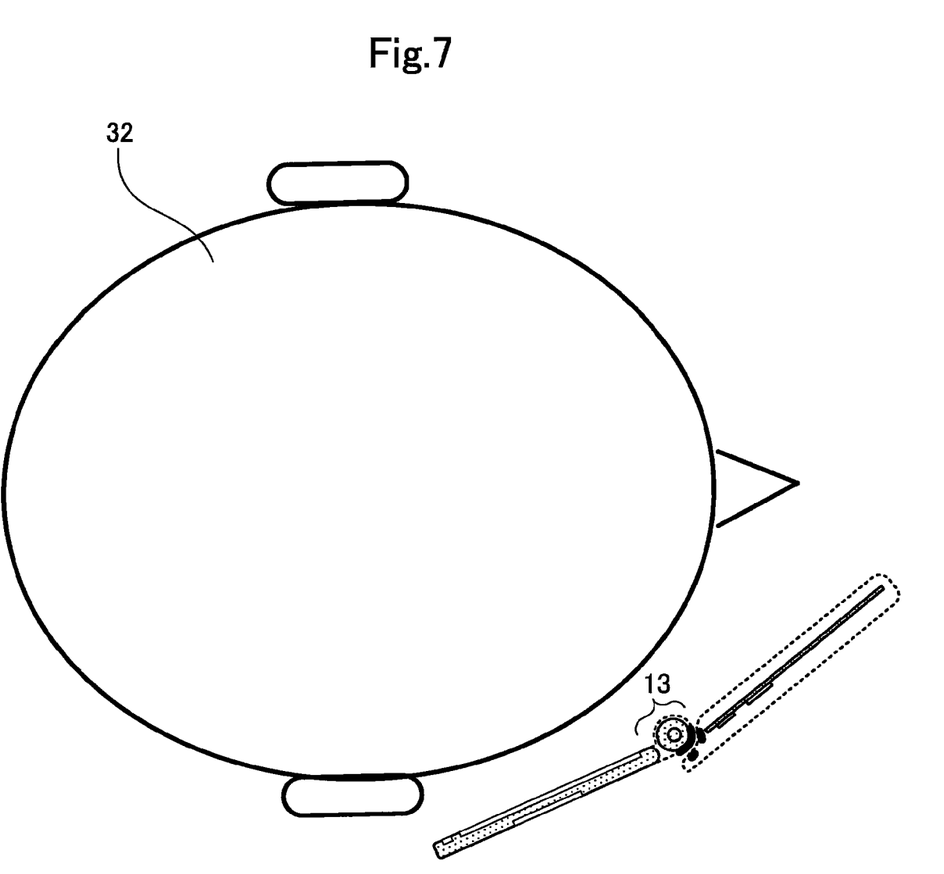
FIG. 7 is a schematic view showing a positional relationship between a human head and the portable wireless device during a telephone call.

The antenna current of the hinge portion 13 is concentrated, caused by the first conductor element 25, on the side where the sub display portion 28 is placed. This leads to the fact that the portable wireless device according to this embodiment is insusceptible to a human head 32 under the condition that the portable wireless device is used in the proximity of the human head 32 as shown in FIG. 7, due to the fact that the antenna current of the hinge portion 13 is concentrated on the side where the sub display portion 28 is placed. The portable wireless device according to this embodiment, therefore, can improve the antenna characteristic (a gain while in use) with 2 dB compared to that of the conventional portable wireless device.

There has been described about the fact that the desired frequency is set at 2170 MHz. However, the first conductor element 25 of the portable wireless device according to this embodiment may be formed to be used at the frequencies other than the above described frequency. The shape of the first conductor element 25 is not limited to the shape shown in FIGS. 1 to 5. The first conductor element 25 may have any shapes with a length substantially equal to a half wavelength of the desired wireless frequency. Though there has been described about the fact that the first conductor element 25 is placed at the uniaxial hinge portion 13, the first conductor element 25 may be placed at any types of hinge portion exemplified by a biaxial hinge portion.

Though there has been described about the fact that the rotating shaft 23 and the metal portion of the first case 11 is separated with the predetermined gap of "dh", the rotating shaft 23 and the metal portion of the first case 11 may be connected by an element having a certain reactance value (such as 2 pF if the element is capacitive).

Though there has been described about the fact that the upper cover 15 and the upper case 16 of the first case 11 are formed by a metal having high conductivity. However, the portable wireless device may function as long as the portable wireless device has one of the upper cover 15, the upper case 16, and the circuit board having a ground pattern accommodated in the first case 11, the circuit board not shown. In other words, the portable wireless device may have any constitutions as long as the metal portion of the first case 11 and the rotating shaft 23 are electromagnetically connected with each other with a predetermined capacitance.

Second Embodiment

Referring now to FIGS. 10 to 13 of the accompanying drawings, a portable wireless device according to the second embodiment of the present invention will be described hereinafter in detail.

Figure 10:
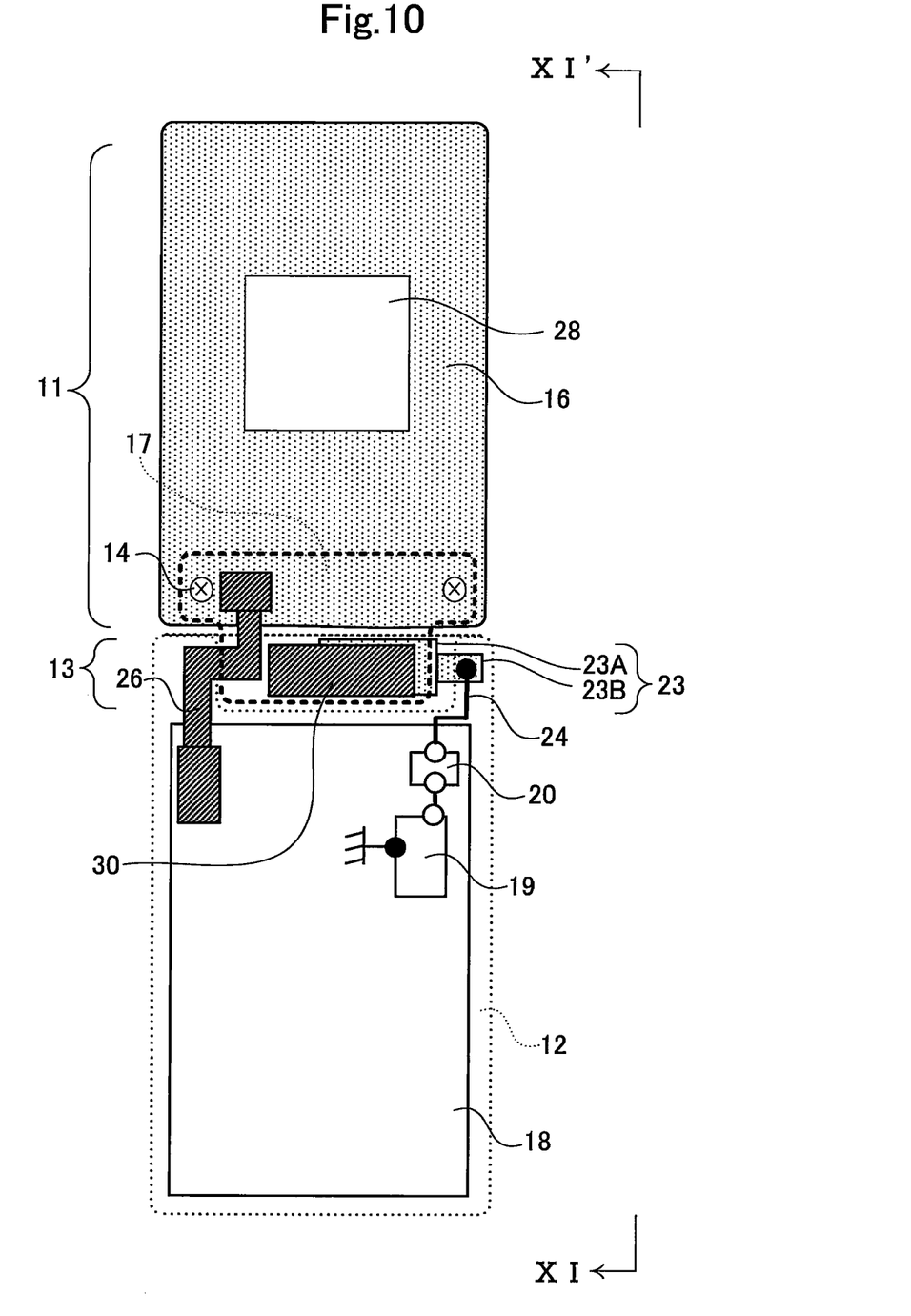
FIG. 10 is a rear view showing the portable wireless device in the opened state according to the second embodiment of the present invention.
Figure 11:
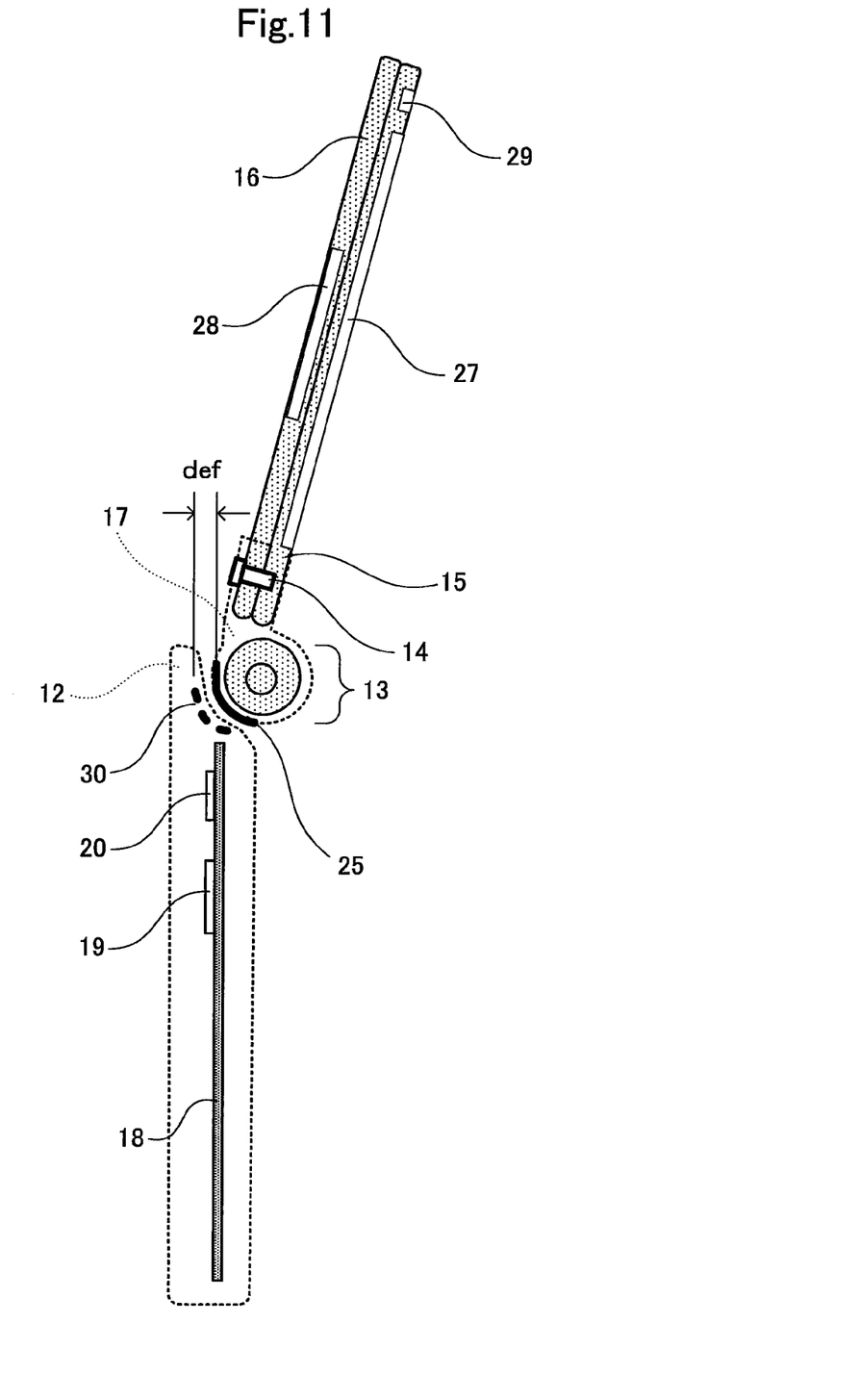
FIG. 11 is a side view showing the portable wireless device in the opened state according to the second embodiment of the present invention.
Figure 12:
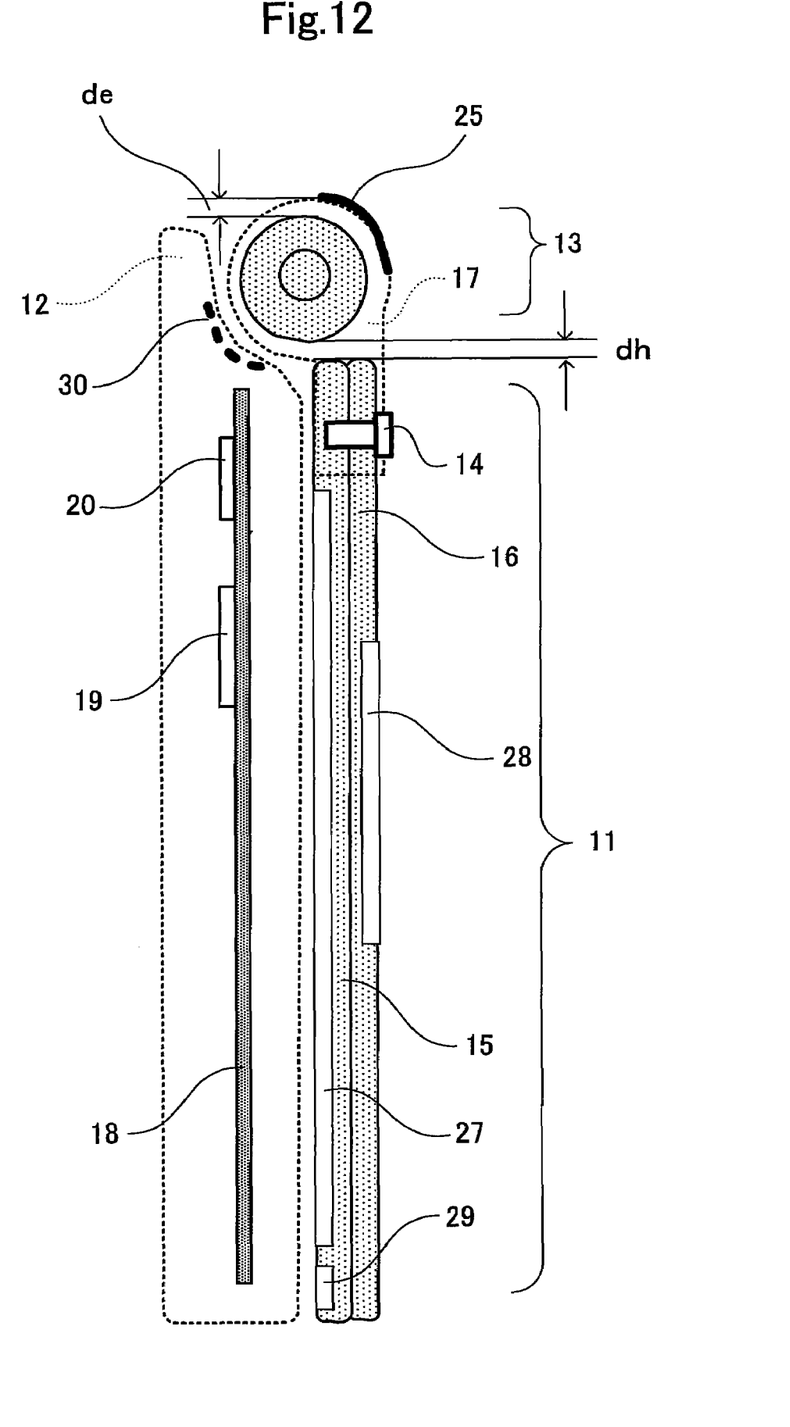
FIG. 12 is a side view showing the portable wireless device in the closed state according to the second embodiment of the present invention.

The constitutional elements of the second embodiment shown in FIGS. 10 to 12 the same as those of the first embodiment of the portable wireless device will not be described but bear the same reference numerals and legends as those of the first embodiment of the portable wireless device.

FIG. 10 is a rear view showing the portable wireless device in the opened state according to the second embodiment of the present invention. FIG. 11 is a side view showing the portable wireless device taken along the line XI-XI' of FIG. 10. FIG. 12 is a side view showing the portable wireless device in the closed state according to the second embodiment of the present invention. FIGS. 10 to 12 respectively show internal structure of the distinctive portions and external constitution of the other portions.

As shown in FIGS. 10 to 12, the portable wireless device further comprises a second conductor element 30. The second conductor element 30 has an area of S $mm^2$ and accommodated in the second case 12 in the proximity of the rotating shaft 23.

As shown in FIG. 11, the first conductor element 25 and the second conductor element 30 are proximately positioned with a gap of "def", such as 2 mm, in the opened state. The first conductor element 25 is movable corresponding to the rotation of the first case 11. Therefore, the first conductor element 25 and the second conductor element 30 in the closed state are positioned to be further compared to the opened state as shown in FIG. 12. Here, the strength of the electromagnetic connection between the first conductor element 25 and the second conductor element 30 varies with respect to the distance therebetween. This results in the fact that the electric resonance induced by the first conductor element 25 in the opened state differs from that in the closed state.

In this embodiment, the resonance induced by the first conductor element 25 in the opened state is lower with 20% than the resonance induced by the first conductor element 25 in the closed state.

Figure 13:
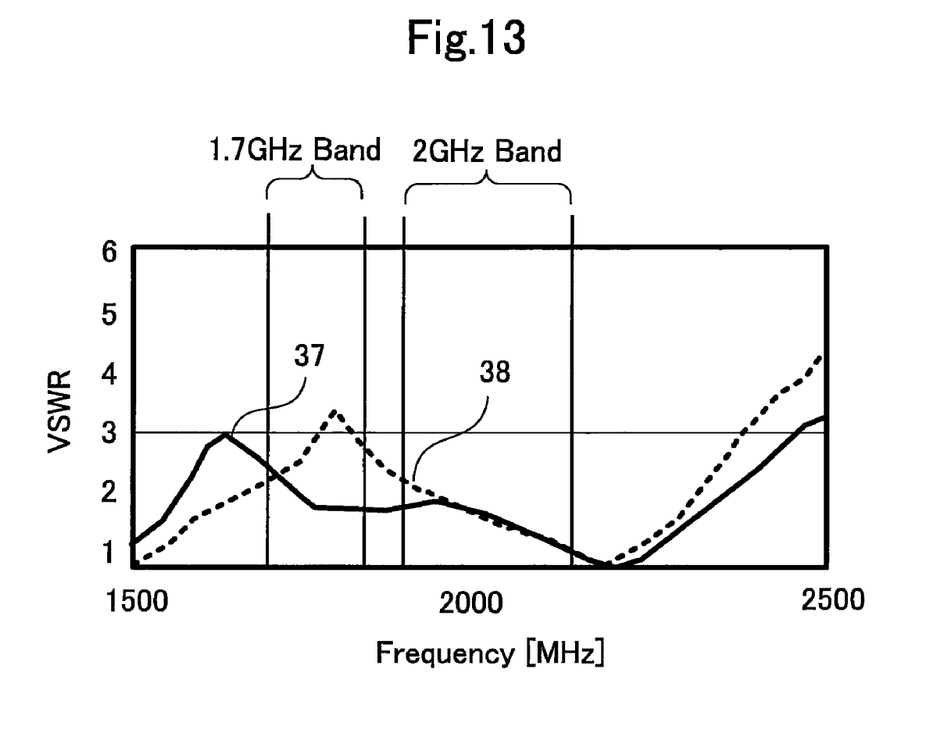
FIG. 13 is a graph showing the standing wave characteristics varied in response to whether the second conductor element is accommodated in the portable wireless device or not, with the portable wireless device in the opened state.

FIG. 13 is a graph showing the VSWR with respect to the frequencies of the high-frequency signals fed to the antenna under the condition that the portable wireless device is in the opened state. In FIG. 13, the solid line represents a VSWR characteristic 37 of the portable wireless device with the second conductor element 30 according to this embodiment. The dotted line represents a VSWR characteristic 38 without the second conductor element 30.

The VSWR characteristic at the bandwidth of 1.7 GHz is deteriorated due to the influence of the first conductor element 25 under the condition that the portable wireless device is constructed without the second conductor element 30. In this case, the radiation efficiency is deteriorated with 2 dB compared to the portable wireless device with the second conductor element 30.

On the other hand, the portable wireless device with the second conductor element 30 has a wideband characteristic of VSWR<3 including the frequency bands of 1.7 GHz and 2 GHz in the opened state, which results in the excellent antenna characteristic. The portable wireless device also has an excellent antenna characteristic in the stand-by mode on the desk as shown in FIG. 6, due to the fact that the first conductor element 25 functions as a director element in the closed state.

There has been described about the fact that the second conductor element 30 is formed by a conducting substance having an area of S mm². However, the second conductor element 30 may have any sharps such as a line shape as long as the second conductor element 30 is electromagnetically connected with the first conductor element 25.

INDUSTRIAL APPLICATION OF THE PRESENT INVENTION

In accordance with the present invention, there is provided a portable wireless device which can have high antenna gain compared to the conventional portable wireless device even in the closed state. The portable wireless device, therefore, can utilize the best performance of the antenna characteristic regardless of whether the portable wireless device is in the opened state or in the closed state.

What is claimed is:

1. A portable wireless device operative to communicate at a wireless operating frequency, comprising:
   a first case having a metal portion and a hinge bracket;
   a second case;
   a hinge portion operative to rotatably connect said first case with said second case;
   a circuit board having a ground pattern, said circuit board accommodated in said second case; and
   a feed portion connected to said circuit board, said hinge portion having a rotating shaft formed by a conductive metal, and
   metal portion, said rotating shaft and said ground pattern collectively function as an antenna element,
   wherein said portable wireless device further comprises a first conductor element accommodated in said hinge bracket in spaced-apart relationship with said rotating shaft with a predetermined gap, said first conductor element having an electrical length substantially equal to a half wavelength of the wireless operating frequency.

2. A portable wireless device as set forth in claim 1, wherein
   said rotating shaft is in spaced-apart relationship with said metal portion with a predetermined gap in such a way that said rotating shaft and said metal portion are electromagnetically connected with each other, and wherein
   said rotating shaft is disposed at said hinge portion in spaced-apart relationship with said ground pattern to ensure said rotating shaft electrically connected with said feed portion.

3. A portable wireless device as set forth in any one of claims 1 and 2, which further comprises
   a second conductor element accommodated in said second case in such a way that said first conductor element and said second conductor element are positioned with a predetermined gap under the condition that said first and second cases are in opened state while said first conductor element and said second conductor element are positioned with a gap wider than said predetermined gap under the condition that said first and second cases are in closed state.

4. A portable wireless device as set forth in any one of claims 1 and 2, wherein said first case has an acoustic aperture formed on one side to have incoming acoustic wave passed therethrough, and said first conductor element is placed on another side of said first case, said one side and said another side opposite to each other.

* * * * *